United States Patent
Meersschaut et al.

(10) Patent No.: US 7,228,681 B2
(45) Date of Patent: Jun. 12, 2007

(54) OPEN LAYERED STEEL CORD WITH HIGH BREAKING LOAD

(75) Inventors: Dirk Meersschaut, Ooigem (BE); Stijn Vanneste, Ingelmunster (BE); Hans Cauwels, Adegem (BE)

(73) Assignee: NV Bekaert SA, Zwevegem (BE)

( * ) Notice: Subject to any disclaimer, the term of this patent is extended or adjusted under 35 U.S.C. 154(b) by 0 days.

(21) Appl. No.: 10/563,988

(22) PCT Filed: Jun. 25, 2004

(86) PCT No.: PCT/EP2004/051246
§ 371 (c)(1),
(2), (4) Date: Jan. 10, 2006

(87) PCT Pub. No.: WO2005/014924
PCT Pub. Date: Feb. 17, 2005

(65) Prior Publication Data
US 2006/0191619 A1 Aug. 31, 2006

(30) Foreign Application Priority Data
Jul. 17, 2003 (EP) .................................. 03102201

(51) Int. Cl.
*D02G 3/48* (2006.01)
(52) U.S. Cl. .......................................... 57/213; 57/217
(58) Field of Classification Search ................. 57/210, 57/212, 213, 217, 223, 232
See application file for complete search history.

(56) References Cited

U.S. PATENT DOCUMENTS

| | | | | |
|---|---|---|---|---|
| 5,074,345 A | | 12/1991 | Penant | |
| 5,661,965 A | * | 9/1997 | Yanagisawa | 57/213 |
| 5,697,204 A | * | 12/1997 | Kuriya | 57/213 |
| 6,334,293 B1 | * | 1/2002 | Poethke et al. | 57/210 |
| 6,748,989 B2 | * | 6/2004 | Cordonnier et al. | 152/556 |
| 7,089,723 B2 | * | 8/2006 | Vanneste et al. | 57/212 |
| 2002/0153078 A1 | | 10/2002 | Cordonnier et al. | |

FOREIGN PATENT DOCUMENTS

| | | |
|---|---|---|
| EP | 0 734 468 B1 | 10/1999 |
| EP | 1 033 435 A1 | 9/2000 |
| WO | WO 99/31313 A1 | 6/1999 |
| WO | WO 02/44464 A1 | 6/2002 |

\* cited by examiner

Primary Examiner—Shaun R. Hurley
(74) Attorney, Agent, or Firm—Foley & Lardner LLP

(57) ABSTRACT

A steel cord adapted for the reinforcement of elastomers includes: a core steel filament with a diameter $d_c$ and coated with a polymer, six intermediate steel filaments with a diameter $d_i$ smaller than or equal to $d_c$, the intermediate steel filaments being twisted around the core steel filament, ten to eleven outer steel filaments with a diameter $d_o$, smaller than or equal to $d_i$ wherein these outer steel filaments are twisted around the intermediate steel filaments, and the outer steel filaments are preformed in order to allow rubber penetration inside the cord. The core steel filament, the intermediate steel filaments, and the outer steel filaments all have a tensile strength of at least 2600 MPa. The cord has an outer diameter D according to the following formula: $D \leq d_c + 2 \times d_i + 2 \times d_o + 0.1$ mm, wherein all diameters are expressed in millimeters (mm).

7 Claims, 1 Drawing Sheet

OPEN LAYERED STEEL CORD WITH HIGH BREAKING LOAD

FIELD OF THE INVENTION

The present invention relates to a steel cord adapted for the reinforcement of elastomers.

BACKGROUND OF THE INVENTION

Steel cords are commonly used for the reinforcement of elastomers such as rubber tires.

Particularly for dynamic applications such as rubber tires, a lot of requirements are Imposed on steel cords. Steel cords are required to have:

(a) a high breaking load;
(b) a high resistance against fatigue;
(c) a high resistance against corrosion.
(d) a low cord diameter A high breaking load (a) can be obtained by twisting the steel cord from high-tensile strength filaments, i.e. steel filaments with a high-carbon steel composition which have been subjected to a high final deformation through a drawing operation so that a high tensile strength is obtained. Supposing an equal starting steel wire diameter for the half-product, the finer the final filament diameters the higher the deformation ratio and the higher the obtainable tensile strength. The high breaking load of the cord is then obtained by twisting the high-tensile filaments in a compact configuration, i.e. a configuration with much steel cross-section per total cross-section.

In order to obtain a high fatigue resistance (b) it is known to decrease the diameter of the individual steel filaments composing the steel cord and to increase the strength of the filaments and to avoid excessive internal wear (fretting) of the cord The decrease in diameter of the individual steel filaments also partially promotes the high breaking load (a) since the further drawing towards finer steel filaments increases the tensile strength.

A high resistance against corrosion (c) is obtained by open steel cord structures which allow elastomer or rubber to penetrate inside the steel cord between the individual steel filaments, so that moisture is prevented from traveling along hollow spaces inside and along the steel cord. This open character of the steel cord, however, is directly opposite to the goal of obtaining a high breaking load (a) and a high fatigue resistance, since it reduces the compactness and the amount of steel cross-section per total cross-section, and because for a high breaking load and high fatigue resistance a lot of small filaments are required, thus making it more difficult to achieve a fully open structure.

A low cord diameter (d) is required to reduce the amount of rubber used to embed the steel cords in, and hence the total cost and weight of the tire. However a low cord diameter is opposed to a high breaking load since less steel is available.

SUMMARY OF THE INVENTION

It is a general object of the present invention to avoid the drawbacks of the prior art.

It is another object of the present invention to provide a steel cord with a high breaking load, a high resistance against fatigue and a high resistance against corrosion.

It is further object of the present invention to provide a steel cord with a high breaking load, a small steel cord diameter and a good rubber penetration.

According to the present invention, there is provided a steel cord adapted for the reinforcement of elastomers.

The steel cord comprises:

a core steel filament with a core steel filament diameter $d_c$; the core filament is coated with a polymer;

six intermediate steel filaments with an intermediate steel filament diameter $d_i$ which is smaller than or is equal to the core steel filament diameter $d_c$; these intermediate steel filaments are twisted around the core steel filament;

ten or eleven outer steel filaments with an outer steel filament diameter $d_o$ which is smaller than or equal to the intermediate steel filament diameter $d_i$; the outer steel filaments are twisted around the intermediate steel filaments; these outer steel filaments are preformed in order to allow rubber penetration inside said cord. The core steel filament, the intermediate steel filaments and the outer steel filaments all have a tensile strength of at least 2600 MPa, e.g. above 2800 MPa.

The steel cord has an outer diameter D according to following formula:

$$D \leq d_c + 2 \times d_i + 2 \times d_o + 0.1$$

wherein all diameters are expressed in millimeter (mm).

The polymer around the core steel filament fills the holes between the core steel filament and the intermediate steel filaments and avoids heavy fretting between the intermediate steel filaments and the core steel filament.

Preferably the steel filament diameters $d_c$, $d_i$ and $d_o$ all range between 0.15 mm and 0.40 mm, e.g. between 0.17 mm and 0.37 mm, e.g. between 0.22 and 0.37 mm.

Preferably the preforming of the outer steel filaments is a polygonal preforming such as disclosed in EP-B-0 734 468. A polygonal preforming of the outer steel filaments has the advantage that full rubber penetration until the intermediate steel filaments is obtained by means of a small degree of preforming. This small degree of preforming has two advantages.

A first advantage is that it does not increase much the outer diameter of the steel cord. As mentioned in the formula above, the outer diameter D of the cord Is only 0.1 mm greater than the sum of the diameters of all individual steel filaments along the diameter of the steel cord.

A second advantage is that It does not decrease substantially the tensile strength of the polygonally preformed steel filaments. It is hereby understood that plastic deforming other than further drawing usually decreases the tensile strength of the preformed steel filaments. With appropriate polygonal preforming, however, this decrease is controlled and limited.

The breaking load of the invention steel cord is higher than 3250 Newton, preferably higher than 3500 Newton, e.g. higher than 3700 Newton.

In the invention steel cord, either the intermediate twisting step is different from the outer twisting step, or the intermediate twisting direction is different from the outer twisting direction, or both.

The invention steel cord may be used in a rubber tire, and more particularly in the carcass plies, in the tread, in the chafer area or in the bead, but is preferably used in the breaker plies of a rubber tire.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
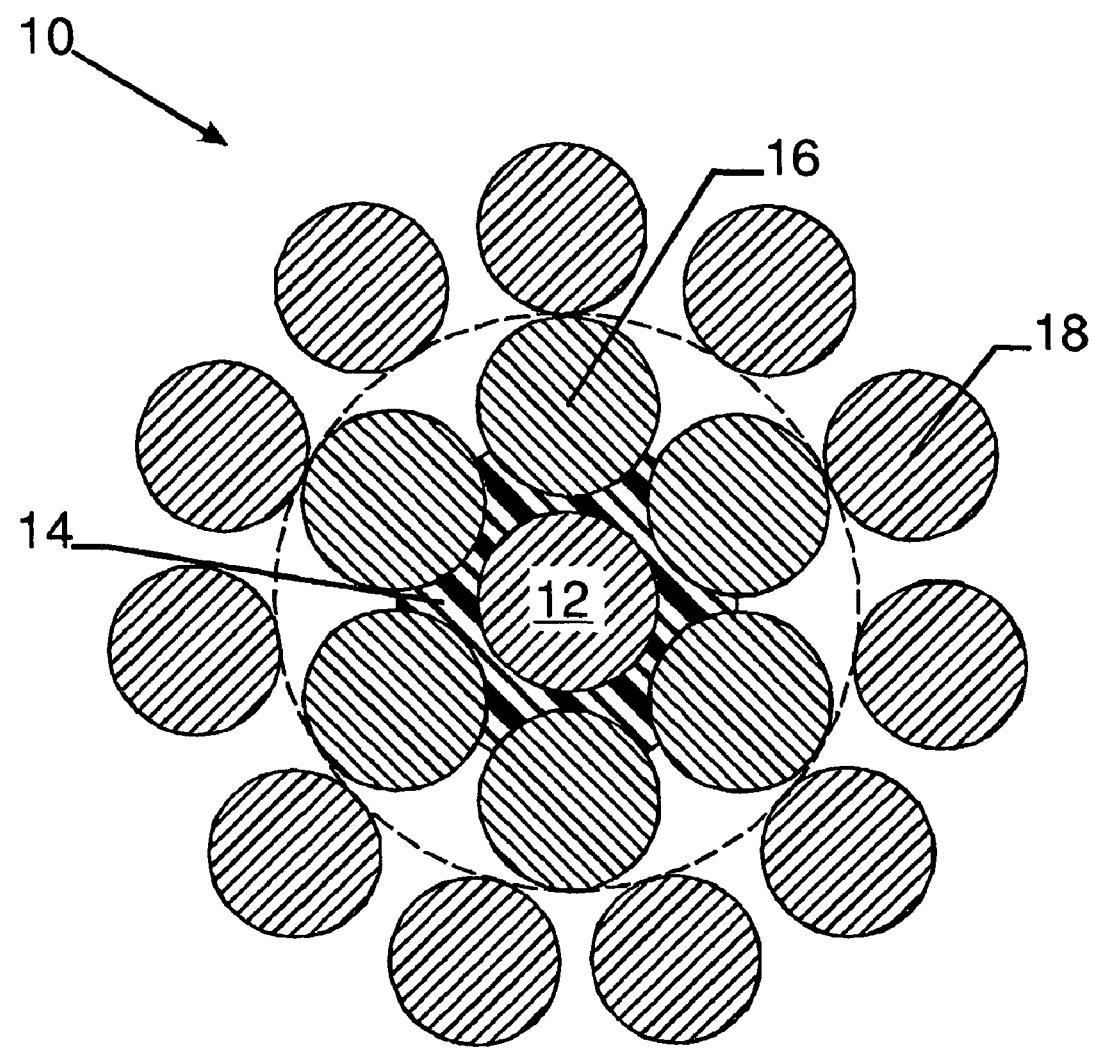
FIG. 1 shows a cross-section of a preferable embodiment of an invention steel cord.

FIG. 1 shows the cross-section of a steel cord 10 according to the invention. The steel cord 10 comprises a steel core filament 12 of 0.30 mm. This steel core filament 12 has been coated in advance, e.g. by means of an extrusion process, by a polymer 14 such as polyethylene terephtalate (PET). PET has proven to be a suitable polymer because of its low absorption of humidity and of its high resistance against mechanical fretting of neighbouring filaments. Prior to the twisting process of the steel cord 10, the diameter of the PET coated steel core filament 12, 14 amounts to about 0.38 mm. An intermediate layer of six intermediate steel filaments 16 is twisted around the PET coated core steel filament 12, 14. The diameter of the intermediate steel filaments 16 is 0.30 mm. The twisting step of the intermediate steel filaments 16 is 9 mm in S-direction. Due to the radial pressure of the intermediate layer filaments 16, the PET 14 flows somewhat between the intermediate steel filaments 16. An outer layer of eleven outer steel filaments 18 is twisted around the intermediate steel filaments 16. The outer steel filaments 18 have been polygonally preformed according to EP-B1-0 734 468. The diameter of the outer steel filaments 18 is 0.28 mm. The twisting step of the outer steel filaments 18 is 18 mm in S-direction.

The cord may be summarized as:

0.30PC+6×0.30+11×0.28 HT BETRU® 9/18 S/S where PC stands for polymer-coated, HT for high-tensile, and BETRU® for polygonally preformed filaments in the outer layer.

Table 1 hereunder summarizes some properties of this cord.

TABLE 1

| 0.30PC + 6 × 0.30 + 11 × 0.28 HT BETRU ® 9/18 S/S | Dimension | Value |
|---|---|---|
| Breaking load | Newton | 3405 |
| Cord diameter | mm | 1.472 |
| Linear density | g/m | 9.426 |
| Pressure drop | % | 0 |
| Sections with porosity | — | 0 |

The cord of Table 1 combines a high breaking load (higher than 3250 Newton) with a dense configuration (diameter smaller than 1.60 mm) and a full rubber penetration (zero pressure drop and no sections with porosity).

The polymer used in the test is a PET, with following properties:

crystallyne melting point : 255–258° C.;
Vicat DIN 53 460 softening point: 180–190° C.;
E-modulus DIN 53 457 ISO 527: 2500 MPa;
Tensile strength DIN 53 455-ISO 527: 60 MPa
Elongation DIN 53 455-ISO 527: >50%;
Hardness DIN 53 456: 120–125 MPa;
Absorption of moisture (20° C., 50% relative humidity): 0.3%.

Higher breaking loads are obtainable if filaments with a higher tensile strength, e.g. filaments with a tensile strength above 3000 MPa are used.

This is the case with the following example:

0.30 PC+6×0.30+11×0.28 UHT BETRU® 10/20 S/S where PC stands for polymer-coated, UHT for ultra high-tensile, and BETRU® for polygonally preformed filaments in the outer layer.

Table 2 summarizes the results of this cord.

TABLE 2

| 0.30PC + 6 × 0.30 + 11 × 0.28 UHT BETRU ® 10/20 S/S | Dimension | Value |
|---|---|---|
| General properties | | |
| Cord diameter-average | mm | 1.493 |
| Cord diameter-maximum | mm | 1.517 |
| Linear density | g/m | 9.323 |
| Brass coating properties | | |
| Thickness | µm | 0.239 |
| Percentage copper | % | 64.13 |
| Brass weight | g/kg | 3.62 |
| Tensile test | | |
| Breaking load $F_m$ | N | 3 870 |
| Tensile strength $R_m$ | MPa | 3 263 |
| Yield strength at 0.2% permanent elongation | MPa | 2 857 |
| Permanent elongation at maximum load $A_g$ | % | 0.7 |
| Permanent elongation at fracture $A_{ts}$ | % | 2.58 |
| E-modulus | MPa | 176 979 |
| PLE (2.5–50 Newton) | % | 0.061 |
| Bending stiffness | | |
| Cord stiffness $E_k$ | Nmm² | 1 332 |
| Anchored cord stiffness $E_v$ | Nmm² | 3 522 |
| Anchoring moment $M_v$ | Nmm | 1.7 |
| Energy loss | % | 14 |
| Rubber penetration | | |
| Pressure drop | % | 0 |
| Fatigue RV LCF DRY | | |
| Pulley diameter | mm | 24 |
| Axial load | N | 1 300 |
| Cycles to fracture | | 21 905 |

As may derived from Table 2, an invention cord has been manufactured with a breaking load of not less than 3870 Newton, an average diameter less than 1.50 mm and with full rubber penetration. Up to now, this particular combination of parameters has not been achieved.

In a broader perspective, the steel filaments of a steel cord according to the invention usually have a diameter ranging from 0.03 mm to 0.80 mm, and preferably from 0.05 mm to 0.37 mm.

The steel filaments have a composition which is along the following lines: a carbon content ranging from 0.70 to 1.15%, a manganese content ranging from 0.10 to 1.10%, a silicon content ranging from 0.10 to 0.90%, sulphur and phosphorous contents being limited to 0.15%, preferably to 0.010% ; additional elements such as chromium (up to 0.20–0.40%), copper (up to 0.20%), nickel (up to 0.30%), cobalt (up to 0.20%) and vanadium (up to 0.30%) may be added.

The final tensile strength $R_m$ of the filaments depends upon its diameter: for example, a 0.2 mm normal tensile filament has a Rm of above about 2800 Megapascal (MPa), a 0.2 mm high tensile (HT) filament has a Rm of above about 3400 MPa, a 0.2 mm super high tensile (SHT) filament has a $R_m$ of above about 3600 MPa and a 0.2 mm ultra high tensile (UHT) filament has a $R_m$ of above about 4000 MPa.

For the highest tensile strengths, the following steel composition is suitable: a carbon content ranging from 0.90% to 1.10%, a silicon content below 0.40%, a manganese content below 0.50% and a chromium content ranging from 0.10% to 0.30%.

The steel filaments are coated with a layer that promotes the adhesion to the rubber: copper alloy coatings such as brass (either low—63.5% Cu—and high copper—67.5% Cu) or a complex brass coating (Ni+bras-s, brass+Co . . . ) or bronze. Zinc coatings and zinc alloy coatings (e.g. with aluminum or magnesium) treated with silanes for rubber adhesion are also possible.

The steel cord according to the invention may be manufactured by means of a known tubular twisting machine or preferably by means of a known double twisting device. Coating of the core steel filament with the polymer can be done by means of an extrusion process in advance of the twisting process.

The invention claimed is:

1. A steel cord adapted for the reinforcement of elastomers, said steel cord comprising:
   a core steel filament having a core steel filament diameter $d_c$ and being coated with a polymer;
   six intermediate steel filaments having an intermediate steel filament diameter $d_i$ smaller than or equal to said core steel filament diameter $d_c$, said intermediate steel filaments being twisted around said core steel filament;
   a number of N outer steel filaments having an outer steel filament diameter $d_o$ smaller than or equal to said intermediate steel filament diameter $d_i$, said outer steel filaments being twisted around said intermediate steel filaments, said outer steel filaments being preformed in order to allow rubber penetration inside said cord, wherein said number of N is ten or eleven;
   said core steel filament, said intermediate steel filaments and said outer steel filaments all having a tensile strength of at least 2600 MPa,
   said cord having an outer diameter D according to the following formula:

$$D \leq d_c + 2 \times d_i + 2 \times d_o + 0.1 \text{ mm};$$

wherein all diameters (D, $d_c$, $d_i$, $d_o$) are expressed in millimeters (mm).

2. A steel cord according to claim 1, wherein all diameters $d_c$, $d_i$ and $d_o$ range from 0.15 mm to 0.40 mm.

3. A steel cord according to claim 1, wherein said outer steel filaments are polygonally preformed.

4. A steel cord according to claim 1, wherein said cord has a breaking load of at least 3250 Newton.

5. A steel cord according to claim 1, said intermediate steel filaments being twisted with an intermediate twisting step, said outer steel filaments being twisted with an outer twisting step, said intermediate twisting step being different from said outer twisting step.

6. A steel cord according to claim 1, said intermediate steel filaments being twisted in an intermediate twist direction, said outer steel filaments being twisted in an outer twist direction, said intermediate twist direction being the same as said outer twist direction.

7. A steel cord according to claim 1, wherein said intermediate steel filaments are twisted in an intermediate twist direction and said outer steel filaments are twisted in an outer twist direction, wherein said intermediate twist direction is different from the outer twist direction.

* * * * *